Patented Oct. 11, 1938

2,132,434

UNITED STATES PATENT OFFICE 2,132,434

PROCESS OF PREPARING A PROTEIN MATERIAL

Philip Rauer, New York, and Paul Torrington, Jr., Forest Hills, N. Y., assignors, by mesne assignments, to Soysein Process Corporation, a corporation of New York No Drawing. Application August 25, 1934, Serial No. 741,524

3 Claims. (Cl. 134—12)

This invention relates to the production of a new protein material especially suitable for use in coating and sizing of papers having properties similar to, and in some respects superior to, casein derived from milk.

It is an object of this invention to derive a new protein product from vegetable matter such as commercial soya bean meal which will be inexpensive to manufacture and which will be of superior quality.

It is a further object to produce a protein material which may be packed and shipped dry or in the form of a paste, without deteriorating.

This protein material is preferably formed from soya bean meal from which the oil has been extracted by a solvent. It is also applicable to certain other similar meals and to meals in which the oil has not been extracted by solvents but in general we prefer the solvent extracted meal because solvent extraction is least apt to prove injurious to the protein.

When a protein extraction is made from vegetable materials such as soya beans a rapid extraction at low temperature is desired, to avoid destroying the desirable characteristics in the extracted protein. The commonly known solvents that are used for this purpose such as sodium hydroxide, sodium carbonate and other alkaline salts, are not satisfactory as they tend to denature the proteins and extract certain gums and other detrimental compounds which affect the color, strength and general characteristics of the finished material. They also fail to eliminate or destroy certain natural coloring matter that is present in the bean to the disadvantage of the finished material and also make the extracted material and residue meal very susceptible to the attack of putrefactive bacteria.

The invention accordingly comprises the several steps and the relation and order of one or more of such steps with respect to each of the others, and the product possessing the features, properties, and the relation of constituents, which are exemplified in the following detailed disclosure, and the scope of the application of which will be indicated in the claims.

As a practical means of carrying out our process we use soya bean meal which has been extracted by benzene. This material is first thoroughly lixiviated with ten times its weight of a solution containing .3% (three-tens percent) sodium sulphite and preferably also .1% (one-tenth percent) sodium hypochlorite. The use of the hypochlorite is to give a whiter and fluffier precipitate, increase the yield, and assist in producing a free filtering meal. The use of sodium sulphite alone tends to more or less gum up the meal which interferes with the proper subsequent separation of the solution containing the extracted protein from the meal from which the proteins have been extracted. Sodium sulphite alone, furthermore, is not an efficient extractor of proteins but when accompanied by sodium hypochlorite, the extraction of proteins proceeds far more efficiently. The solution containing the meal is agitated for a number of hours at a moderate temperature, for example, 60° F. and is then separated from the meal by any desirable means, for example, by centrifuging. By reason of the nature of the solvents used the meal may be subjected to a much longer period of extraction without any danger of denaturing the protein, thereby making large yields possible and eliminating the need of higher temperatures.

Apparently, there is formed an addition or substitution molecule or molecules with the extracted proteins which possess the ability to resist putrefaction, high adhesive strength, light color and maximum solubility.

The residue meal remaining from the above treatment is remarkably free from the attack of putrefactive bacteria, it does not form in a gummy mass and for this reason it more readily gives up a large amount of its available protein in solution and is also readily dried without caking and gives a residue meal of high grade.

It has been proposed to treat the meal with a solution of soda sulphite in connection with lime to denature the product by removing certain portions insoluble in lime. This is done either by treating the meal with a lime solution before extracting the protein or else by first conducting the extracting operation with the sulphite solution and then treating the solution with lime, thereby eliminating certain portions insoluble in lime which had previously been dissolved by the sulphite.

This denaturing is in itself undesirable not only on account of its expense but also on account of the fact that by separating out certain portions of the protein, the final yield is reduced.

The denaturing of the protein interferes with its desirable qualities. Where the lime treatment is first given to the protein it apparently interferes with the subsequent sulphite reaction which we have found beneficial and where the lime treatment is subsequent to the sulphite reaction the desirable qualities due to the sulphite are apparently destroyed.

We use the term "sulphite protein" here to refer to this protein which has been formed by the direct treatment of the protein body with the sulphite and without denaturing treatment by lime. The treatment is not intended necessarily to imply that the sulphite radical remains unchanged in the final product, although in many cases we find it desirable that it shall be present.

The treatment of the protein with a sulphite solution accompanied by the step of denaturing by lime does not impart to the protein the qualities of a sulphite protein and we have not found any evidence that any sulphite addition or substitution products are formed by sulphite in connection with lime or are present in the final product.

In some cases we have found a very satisfactory product can be obtained by the use of sulphite alone if the process is rapidly carried out and the curd is allowed to contain a slight excess of sulphite.

The protein solution from the above operation, after being separated from the meal, is precipitated by the addition of mixed hydrochloric and sulphuric acid to the pH of 4.4. After separating the liquid from the precipitate, the precipitate is again washed with clean water adjusted to a pH 4.4 and after being separated from the wash solution enough sodium sulphite is added to this plastic mass to bring it back to a pH of 6.5.

While in some cases different mixtures of acids may be used, we have found that a very desirable result can be obtained by the use of a mixture of 90% HCl and 10% $H_2SO_4$ in that the protein is precipitated without other undesirable products and in a desirable physical condition. It will be understood that the proportions of acid and the relative proportions of different acids used may vary, dependent upon the particular batch of protein being treated.

Sulphuric acid when used alone results in certain disadvantages such as discoloration of product, a muddy precipitate, a gummy or sticky condition of the precipitate, such that it cannot be satisfactorily washed. On the other hand, certain beneficial results flow from the use of sulphuric acid. By therefore restricting the volume of sulphuric acid and constituting the precipitating acid in large part of an acid such as hydrochloric acid, the requisite precipitation is obtainable together with those advantages which are attributable to sulphuric acid, but under avoidance of the disadvantages which sulphuric acid alone would introduce. The particular proportions of the two acids hereinabove stated have been found to be satisfactory, but the precise limits of the percentages of the two acids where the advantageous effects of the mixture cease to be produced vary somewhat with the precise nature of the proteins in the solution to be affected by the acid. The important point, however, is that the sulphuric acid percentage shall be restricted to a point where disadvantageous effects which accompany its use when used alone are not set up in the product.

This precipitation is preferably carried out at a temperature of about 75° F. This precipitated protein material is granular in character and readily separates from its contained water in a press. It is also readily filtered.

The ultimate product may be maintained in a curd form if desired, without deterioration and in that form its re-solution is greatly facilitated. The material can also be dried under the influence of slight heat at a temperature of 115° F. in an ordinary drying tunnel without discoloration.

If desired, the material may be pressed as free from water as is possible in a curd press and may then be put in drying trays and dried under reduced pressure at 150° F. This drying is also very successfully carried out in the presence of hot acetone vapor which causes a very rapid separation of water in a short space of time and avoids any oxidation during the drying period by the elimination of any contact with air.

This material is of very high quality. It has a color and adhesiveness superior to that of milk casein and it is capable of going into clear solution. It will readily dissolve in any one of a large number of solvents, but we have found that borax or ammonia both produce suitable results.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What we claim and desire to secure by Letters Patent is:

1. The process of forming a vegetable protein material which comprises dissolving protein from a vegetable meal, separating the protein-containing solution, precipitating the protein by acid treatment, separating the precipitate from the supernatant liquid, eliminating protein material soluble in the acid precipitator solution, bringing the precipitate to a condition of a plastic mass and adding an alkali metal sulphite, and then reducing the paste to dry powdered form under preservation in the powder of the added sulphite.

2. The process of forming a vegetable protein material which comprises dissolving protein from a vegetable meal, separating the protein-containing solution, precipitating the protein by acid treatment, separating the precipitate from the supernatant liquid, eliminating protein material soluble in the acid precipitator solution, bringing the precipitate to a condition of a plastic mass, and adding an alkali metal sulphite and preserving the plastic condition in the mass whereby the product can be directly shipped as a paste containing sulphite and be used in the paper-coating industry in paste form.

3. The process of forming a vegetable protein which comprises dissolving the protein, separating the protein-containing solution, precipitating the protein with acid, separating the precipitate from the supernatant liquid, eliminating protein material soluble in the acid precipitator solution, bringing the precipitate to a condition of a plastic mass and adding an alkali metal sulphite to the precipitated protein in such quantities as to bring the pH of the product to approximately 6.5.

PHILIP RAUER.
PAUL TORRINGTON, Jr.